(12) United States Patent
Yamagata

(10) Patent No.: US 7,644,586 B2
(45) Date of Patent: Jan. 12, 2010

(54) CONTROL OF SUPERCHARGED ENGINE

(75) Inventor: Naoyuki Yamagata, Higashihiroshima (JP)

(73) Assignee: Mazda Motor Corporation, Hiroshima (JP)

(\*) Notice: Subject to any disclaimer, the term of this patent is extended or adjusted under 35 U.S.C. 154(b) by 67 days.

(21) Appl. No.: 11/776,175

(22) Filed: Jul. 11, 2007

(65) Prior Publication Data

US 2008/0011278 A1 Jan. 17, 2008

(30) Foreign Application Priority Data

Jul. 14, 2006 (JP) ............... 2006-194518

(51) Int. Cl.
*F02B 29/08* (2006.01)
*F02D 13/00* (2006.01)
*F02D 23/00* (2006.01)

(52) U.S. Cl. .................. 60/612; 123/561; 123/562
(58) Field of Classification Search .................. 60/611, 60/612; 123/561, 562
See application file for complete search history.

(56) References Cited

U.S. PATENT DOCUMENTS

| | | | |
|---|---|---|---|
| 5,005,539 A * | 4/1991 | Kawamura | 123/21 |
| 5,022,353 A * | 6/1991 | Kamamura | 123/21 |
| 5,158,044 A * | 10/1992 | Kawamura | 123/21 |
| 6,523,504 B2 * | 2/2003 | Miura | 123/21 |
| 6,637,205 B1 | 10/2003 | Ahmad et al. | |
| 6,751,957 B2 | 6/2004 | Morgan et al. | |

2001/0054287 A1 * 12/2001 Hoecker et al. ............... 60/612

(Continued)

FOREIGN PATENT DOCUMENTS

| | | | |
|---|---|---|---|
| FR | 2844552 A1 * | 3/2004 | |
| JP | 63297729 A * | 12/1988 | |
| JP | 2006-77604 A | 3/2006 | |

*Primary Examiner*—Thomas E Denion
*Assistant Examiner*—Mary A Davis
(74) *Attorney, Agent, or Firm*—Alleman Hall McCoy Russell & Tuttle LLP

(57) ABSTRACT

There is provided a method of controlling an engine system. The engine system comprises an internal combustion engine, a supercharging system having at least one supercharger to boost intake air to the internal combustion engine, a turbine, and a motor. The turbine receives an exhaust gas flow from an exhaust system of the internal combustion engine and is capable of at least partly driving the supercharging system. The motor is capable of at least partly driving the supercharging system. The method comprises operating the exhaust system in a first exhaust state and operating the motor in a first motor state when a speed of the internal combustion engine is below a first engine speed, operating the exhaust system in the first exhaust state and operating the motor in a second motor state where power to drive the motor is reduced from that in the first motor state when the speed of the internal combustion engine is between the first engine speed and a second engine speed which greater the said first engine speed, and operating the exhaust system in a second exhaust state where energy transmitted from the internal combustion engine to the turbine is reduced from that in the first exhaust state and operating the motor in the second motor state when the speed of the internal combustion engine is above the second engine speed. Accordingly, the maximum torque can be increased while maintaining the system efficiency over the entire engine speed range.

17 Claims, 10 Drawing Sheets

U.S. PATENT DOCUMENTS

2002/0195086 A1* 12/2002 Beck et al. .................. 123/435
2004/0069256 A1* 4/2004 Melchior ................. 123/90.12
2004/0194466 A1* 10/2004 Kawamura et al. ............ 60/612
2004/0194767 A1* 10/2004 Igarashi et al. .............. 123/562
2005/0011193 A1 1/2005 Pagot
2006/0064981 A1* 3/2006 Kojima et al. ................. 60/612

* cited by examiner

CONTROL OF SUPERCHARGED ENGINE

BACKGROUND

The present description generally relates to a supercharged engine, and more particularly relates to controlling a supercharging system. The system has a motor and an exhaust gas turbine both capable of driving a supercharger to boost intake air to the engine.

There is known and presented, for example in Japanese Patent Application Publication no. 2006-77604A, a supercharging system having a supercharger to boost intake air to the engine, and an electric motor and a turbine each capable of at least partly driving the supercharger.

Generally speaking, the turbine efficiency is higher when the exhaust gas flow is greater. On the other hand, when the exhaust gas flow is relatively low, the turbine efficiency may not be sufficient to obtain a desired boost pressure. To improve the turbine efficiency at the low exhaust gas flow range, the turbine of the '604 publication has a variable geometry nozzle that variably regulates exhaust gas flow to a turbine wheel. The variable geometry nozzle position can be adjusted to change the sectional area of the conduit that directs exhaust gases to the turbine so that the actual boost pressure is made to match the desired boost pressure.

When the sectional area of the turbine conduit is reduced, the exhaust gas flow rate is increased and the efficiency of the turbine is increased. However, the pressure in the exhaust manifold between the engine and the nozzle is also increased. The higher exhaust manifold pressure creates greater resistive force against an upward movement of the piston during an exhaust stroke of a cylinder cycle. That is, it creates higher pumping losses during the exhaust stroke. On the other hand, when the intake manifold pressure is lower, the piston receives greater resistive force against its downward movement during an intake stroke of a cylinder cycle. In other words, the lower intake manifold pressure translates into greater pumping losses during the intake stroke. Therefore, as the difference between exhaust manifold pressure and intake manifold increases, the engine pumping losses increase and the supercharging system efficiency decreases.

In addition to the turbine, the '604 publication also describes using an electric motor to drive the supercharger. This further increases supercharging system efficiency. When the engine is in a predetermined operating range, the motor is driven, the sectional area of the conduit is increased, and the exhaust manifold pressure is reduced. Then, the motor partly drives the supercharger and compensates for the reduction in power that flows from the turbine to drive the supercharger.

The method described in the '604 publication can increase the supercharging system efficiency when the electric motor drives the supercharger in the predetermined engine operating range. Specifically, the electric motor is basically driven in the mid torque range. It is not driven at full load conditions over the entire engine speed range. Consequently, if the prior art method is applied for a supercharging system having a turbine whose efficiency is higher at the higher engine speed range, it can not produce high torque at the lower speed range. In addition, at the higher engine speed range, the electric motor is driven and is supposed to make less assist for the supercharging system, and the system can consume the unnecessarily greater amount of electric energy. Therefore, there is room for improvement over the prior art method in terms of the performance and the efficiency of the supercharged engine system.

SUMMARY

There is provided, in one aspect of the present description, a method of controlling an engine system. The engine system comprises an internal combustion engine, a supercharging system having at least one supercharger to boost intake air to the internal combustion engine, a turbine, and a motor. The turbine receives an exhaust gas flow from an exhaust system of the internal combustion engine and is capable of at least partly driving the supercharging system. The motor is capable of at least partly driving the supercharging system. The method comprises operating the exhaust system in a first exhaust state and operating the motor in a first motor state when a speed of the internal combustion engine is below a first engine speed, operating the exhaust system in the first exhaust state and operating the motor in a second motor state where power to drive the motor is reduced from that in the first motor state when the speed of the internal combustion engine is between the first engine speed and a second engine speed which greater the said first engine speed, and operating the exhaust system in a second exhaust state where energy transmitted from the internal combustion engine to the turbine is reduced from that in the first exhaust state and operating the motor in the second motor state when the speed of the internal combustion engine is above the second engine speed.

According to the method of the first aspect of the present description, the inventor herein ingeniously configured operation of the motor and the exhaust system in accordance with the engine speed so that a high level of torque can be obtained while maintaining the system efficiency over the entire engine speed range. In particular, power to drive the motor is increased and the exhaust system is operated in the first exhaust state. The first exhaust state comprises an exhaust configuration that increases the amount of energy transmitted from the engine to the turbine. This helps to increase the compressor output even though compressor efficiency is relatively low at lower engine speeds. Operating the exhaust system in this first state, combined with increasing the amount of power the motor supplies to the compressor, increases the amount of air that is available to the engine, thereby increasing the amount of engine power available at lower engine speeds.

When the engine is operated at mid range speeds, power to the compressor drive motor is reduced and the exhaust system is set to the first exhaust system state. As mentioned above, the first exhaust state increases the amount of energy delivered from the engine to the turbine. Further, as engine speed increases the amount of energy transmitted from the engine to the turbine can be increased. Consequently, the power delivered from the engine to the turbine becomes sufficient to drive the turbine and the amount of drive assistance supplied by the motor can be reduced. In this way, engine output torque can be increased while the amount of energy spent to drive the motor is decreased. As a result, system efficiency can be improved at mid range speeds.

System efficiency can also be improved at higher speeds. Specifically, efficiency can be improved by reducing the power delivered to the drive motor and by operating the exhaust system in a second state. In the second state, the exhaust system decreases the amount of energy delivered to the turbine and increases the efficiency of the engine. In this speed range, the compressor operates efficiently, thereby allowing adjustments to be made to the exhaust system without significantly impacting compressor operation. As a result, the exhaust system adjustments act to reduce the engine pumping losses while at the same time the turbine continues to operate efficiently. Taken together, these actions enable high engine torque to be produced while the engine operates efficiently and while less energy is delivered from the motor to the compressor.

In embodiments, the exhaust system may include an exhaust manifold, exhaust passages, and engine exhaust valves which open and closes the combustion chamber of the internal combustion engine to the exhaust manifold.

In one embodiment, the engine exhaust valves may be opened later during the cylinder cycle in the first exhaust state than in the second exhaust state. This increases the peak exhaust gas pressure in the first exhaust state. Therefore, the energy transmitted from the engine to the turbine may be increased in the first exhaust state.

In another embodiment, the engine system may comprise a volume chamber capable of communicating with the exhaust system between the internal combustion engine and the turbine. An exhaust control valve may be controlled to shut off the volume chamber from the exhaust system so as to reduce the volume between the engine and the turbine in the first exhaust state. Therefore, there is less exhaust gas pressure decrease between the cylinder and the turbine.

In still another embodiment, the internal combustion engine may have a plurality of cylinders, and the exhaust system may have a first discrete passage and a second discrete passage connecting between a second of the cylinders and the turbine. A connecting passage linking the first and second discrete passages is bisected by an exhaust control valve arranged in the connecting passage. The exhaust control valve may close the connecting passage in the first exhaust state so that the volume between the cylinder and the turbine may be reduced and the pressure decrease of the exhaust gas from the individual cylinders may be reduced in the first exhaust state.

In still another embodiment, the exhaust system may have a variable nozzle capable of regulating exhaust gas flow to the turbine. The variable nozzle may regulate the exhaust gas flow so as to increase the power transmitted from the engine to the turbine in the first exhaust state.

BRIEF DESCRIPTION OF THE DRAWINGS

The advantages described herein will be more fully understood by reading examples of embodiments in which the above aspects are used to advantage, referred to herein as the Detailed Description, with reference to the drawings wherein.

DETAILED DESCRIPTION

Figure 1:
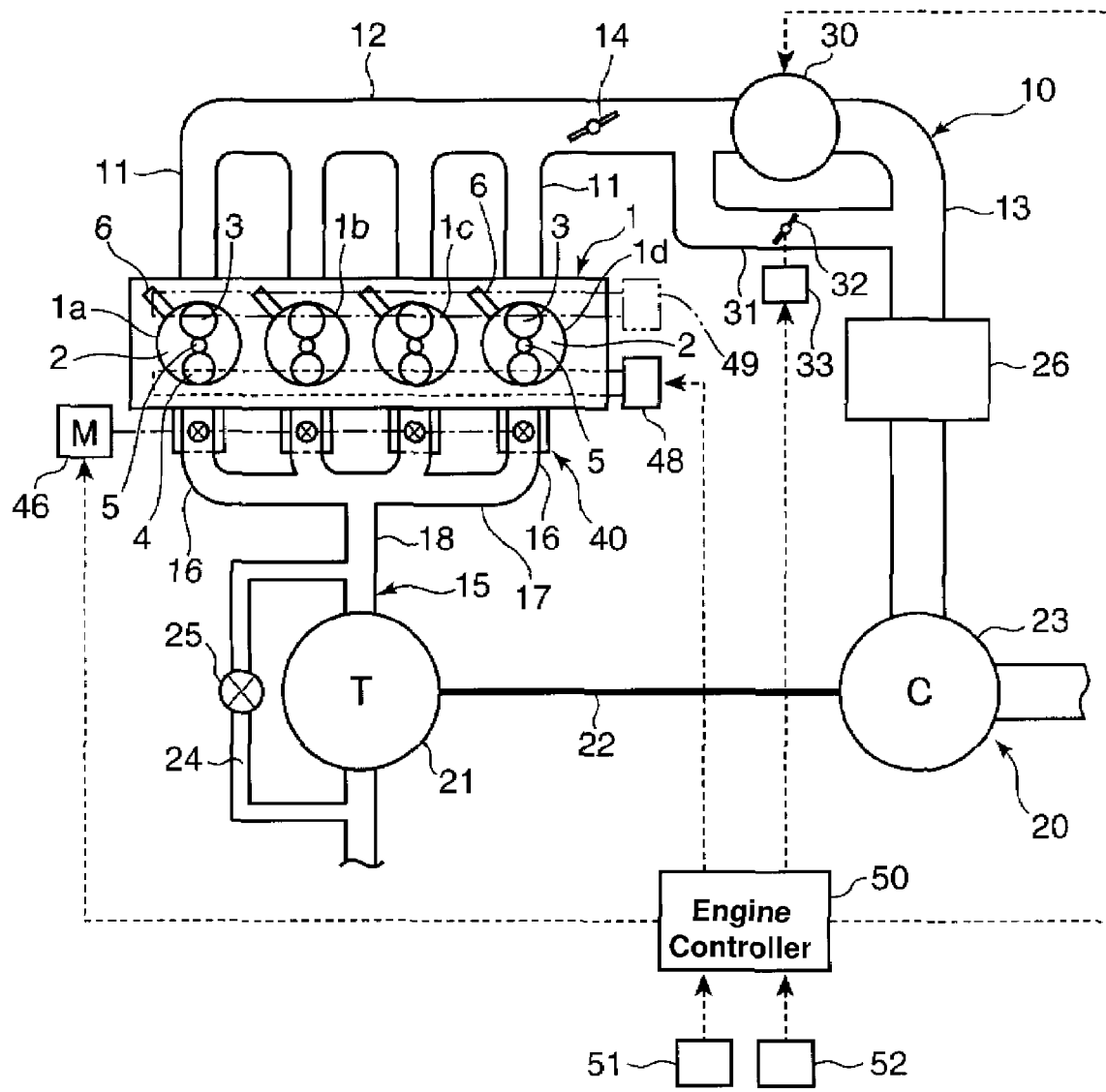
FIG. 1 shows a schematic view of a supercharged engine system according to a first embodiment of the present description.

Embodiments of the present description will now be described with reference to the drawings, starting with FIG. 1, which shows an overall construction of supercharged engine system in accordance with a first embodiment. The supercharged engine system comprises an internal combustion engine 1. The engine 1 has a plurality of cylinders 1a through 1d, not limited to but four cylinders in this embodiment, in its cylinder block. The cylinders 1a through 1d respectively have pistons therein, and the piston can reciprocate in the cylinder and is connected to a crankshaft to output torque as is well known in the art. The engine 1 has four combustion chambers 2. The combustion chamber 2 is defined by a wall of the cylinder, the piston and a cylinder head also as is well known in the art. On the cylinder head of the each cylinder, there are provided an intake port and an exhaust port opening to the each combustion chamber 2. An intake valve 3 and an exhaust valve 4 are provided respectively in the intake port and the exhaust port and capable of shutting off the ports from the combustion chamber as is well known in the art. Further, on the cylinder head, a spark plug 5 and a fuel injector 6 are provided.

An intake system 10 is connected to the engine 1 for supplying fresh air to the combustion chamber 2. An exhaust system 15 is connected to the engine 1 for directing exhaust gas out of the combustion chamber 2. The intake system 10 comprises an intake manifold 12 having discrete intake passages 11 that are communicated respectively to the intake ports of the cylinders 1a through 1d. The intake system 10 further comprises a common intake passage 13 arranged upstream of the intake manifold 12. A throttle valve 14 is arranged in the common intake passage 13 for regulating the intake airflow as is well known in the art. On the other hand, the exhaust system 15 comprises an exhaust manifold 17 having discrete exhaust passages 16 that are communicated respectively to the exhaust ports of the cylinders 1a through 1d. Further, the exhaust system 15 comprises a common exhaust passage 18 arranged downstream of the exhaust manifold 17. Also for the engine 1, a turbocharger 20 and an electric supercharger 30 are provided.

The turbocharger 20 comprises a turbine 21 which is rotationally driven with energy of the exhaust gas as is well known in the art. It further comprises a compressor 23 connected to the turbine 21 through the shaft 22. The turbine 21 rotates and drives the compressor 23 to boost the intake air to the engine 1. The turbocharger 20 is of a relatively large size and a high speed type showing a greater boost performance at a higher engine speed range.

The turbine 21 is arranged in the common exhaust passage 18. A waste gate passage 24 bypasses the turbine 21, and a waste gate valve 25 is arranged in the waste gage passage 24. The compressor 23 is arranged in the common intake passage 13. An intercooler 26 for cooling the boosted air is provided in the common intake passage 13 downstream of the compressor 23.

The electric supercharger 30 is arranged in the common intake passage 13 downstream of the intercooler 26. The throttle valve 14 is arranged in the common intake passage 13 downstream of the electric supercharger 30. The electric supercharger 30 comprises a supercharger with an impeller or the like and an electric motor for driving the supercharger.

A bypass passage 31 is provided as part of the intake passage 10 and bypasses the electric supercharger 30. There is provided, in the bypass passage 31, a bypass control valve 32 which regulates airflow in the bypass passage 31 and is driven by an actuator 33.

In this embodiment, a variable exhaust volume system 40 and a variable valve timing system 48 are provided for increasing energy of exhaust gas supplied to the turbine 21 in an operating region where a boost performance of the turbocharger 20. The variable exhaust volume system 40 is able to vary a volume of the exhaust passage upstream of the turbine 21. The variable valve timing system 48 is able to vary closing timing of the exhaust valve 4.

Figure 2:
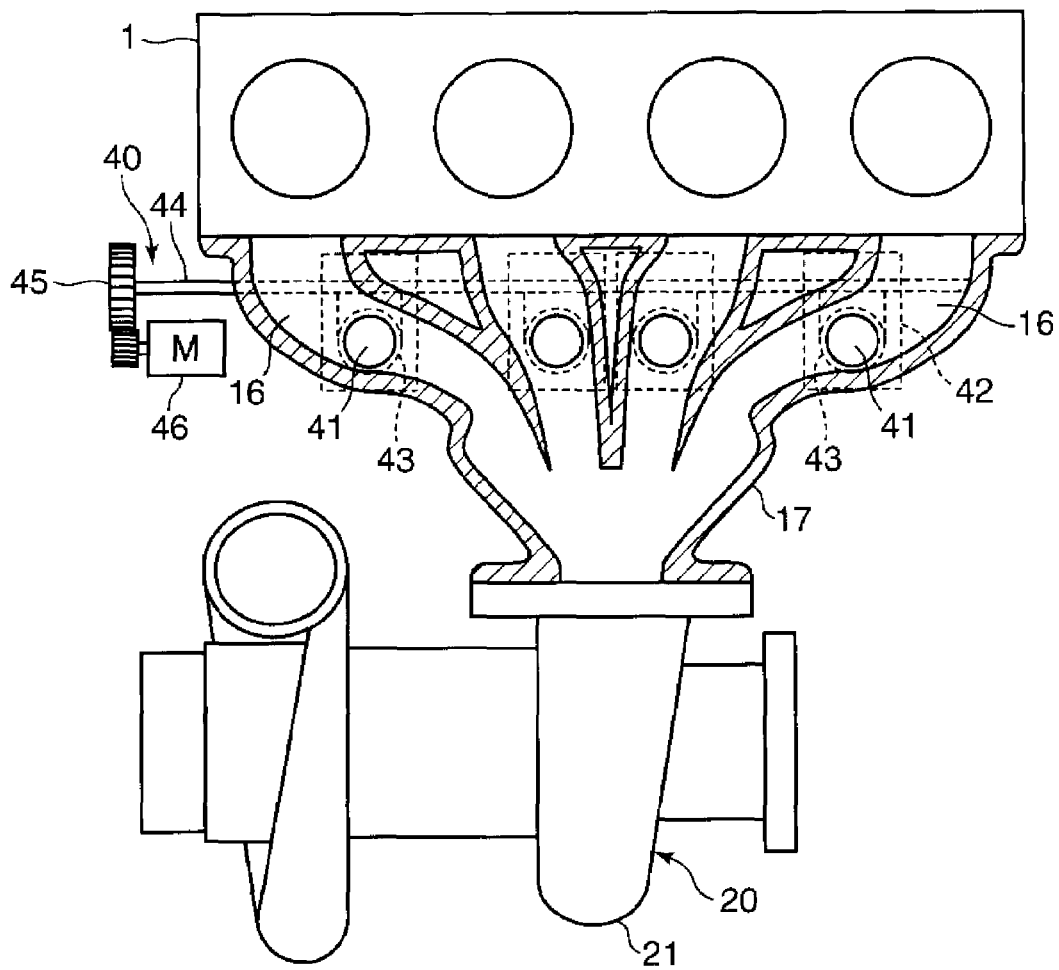
FIG. 2 shows a partially cross sectional view of an exhaust system according to the first embodiment.
Figure 3:
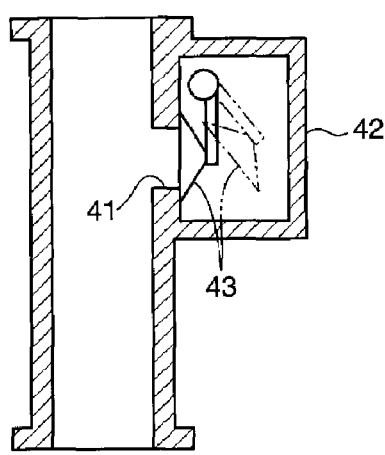
FIG. 3 shows a cross sectional view of a variable exhaust volume system according to the first embodiment.

Referring to FIGS. 2 and 3, there is shown a detail of the variable exhaust volume system 40. It comprises volume chambers 42 and an exhaust volume control valve 43. The volume chambers 42 communicate to the respective discrete exhaust passages 16 of the exhaust manifold 17 through respective conduits 41. The variable volume valve 43 is capable of closing the corresponding conduit 41 and driven by a motor 46 through a common shaft 44, a gear 45 and the like. When the variable volume valves 43 close the conduits 41, the communication between the discrete exhaust passages 16 and the volume chambers 42 is shut off, and the volume of the exhaust system 15 upstream of the turbine 21 is reduced. On the other hand, when the variable volume valves 43 open the conduits 41, the communication is enabled, and the volume of the exhaust system 15 upstream of the turbine 21 is increased.

The variable valve timing system 48 shown in FIG. 1 has a variable cam timing mechanism which is capable of varying a phase of an exhaust camshaft with respect to the crankshaft (engine output shaft). As is well known in the art, the exhaust camshaft reciprocally drives the exhaust valves 4. Various structures of the variable cam timing mechanism are known and not shown herein. But, for example, a phase changing member is arranged between the camshaft and a cam pulley which receives a rotation of the crankshaft through a timing belt, and the phase changing member is hydraulically or electrically driven.

Figure 4:
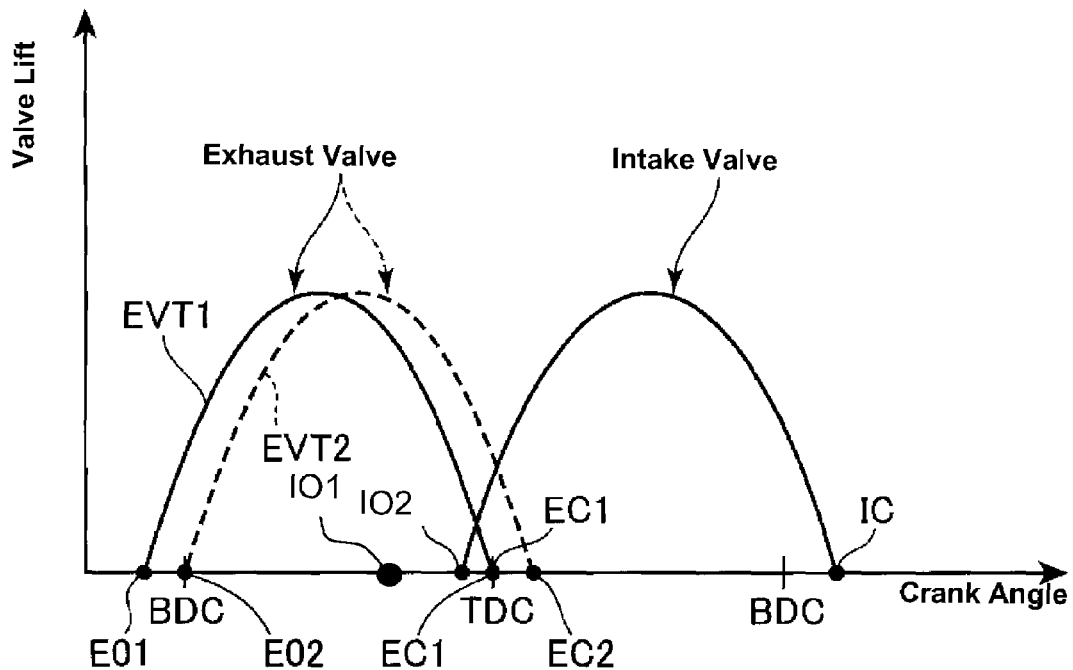
FIG. 4 shows lifts of intake and exhaust valves with variable exhaust valve timing in accordance with the first embodiment.

As shown in FIG. 4, the variable valve timing system 48 is capable of defining a second exhaust valve timing EVT1 shown in a solid line and a first exhaust valve timing EVT2 which is retarded from the second exhaust valve timing EVT1 and shown in a broken line. With the second exhaust valve timing EVT1, the exhaust valve 4 opens at timing EO1 in a cylinder cycle and closes at timing EC1 in the cylinder cycle. The timing EO1 is earlier than a bottom dead center (BDC) of the cylinder cycle by a predetermined crank angle. The timing EC1 is around a top dead center (TDC) in the engine cycle. On the other hand, with the first exhaust valve timing EVT2, the exhaust valve 4 opens at timing EO2 in a cylinder cycle and closes at timing EC2 in the cylinder cycle. The timing EO2 is around the bottom dead center (BDC) of the cylinder cycle. The timing EC2 is later than the top dead center (TDC) of the cylinder cycle by a predetermined crank angle. Furthermore, a first intake valve opening timing IO1 may be defined during the cylinder cycle in the first exhaust state that corresponds to the first exhaust valve timing EVT2 and a second intake valve opening timing IO2 may be defined during the cylinder cycle in the second exhaust state that corresponds to the second exhaust valve timing EVT1. The second intake valve opening timing IO2 occurs later than the fist intake valve opening timing IO1.

Referring back to FIG. 1, an engine controller 50 is provided for controlling various functions of the engine system. The engine controller 50 is a microprocessor based control unit comprising a memory which stores programs and data, a central processing unit which processes the stored programs and data, and input/output terminals which inputs and outputs signals as is well known in the art. The engine controller 50 receives the signals from various sensors including an accelerator position sensor 51 which detects a position of an accelerator pedal in a reflection of a desired engine output torque and an engine speed sensor 52 which detects a rotational speed of the engine 1. On the other hand, in accordance with the received signals, the engine controller 50 controls various actuators including the electric motor of the electric supercharger 30, the actuator 33 of the bypass control valve 32 and the variable valve timing system 48.

The engine controller 50 computes amount of air inducted into the combustion chambers of the engine 1 based on an intake air flow rate, an intake manifold pressure and others as is known in the art. Then, based on the computed air amount, the engine controller 50 computes a fuel injection amount or a pulse width of duration of opening of the fuel injector 6 so as to achieve a desired air fuel ratio, for example a stoichiometric air fuel ratio depending on the fuel property.

Figure 5:
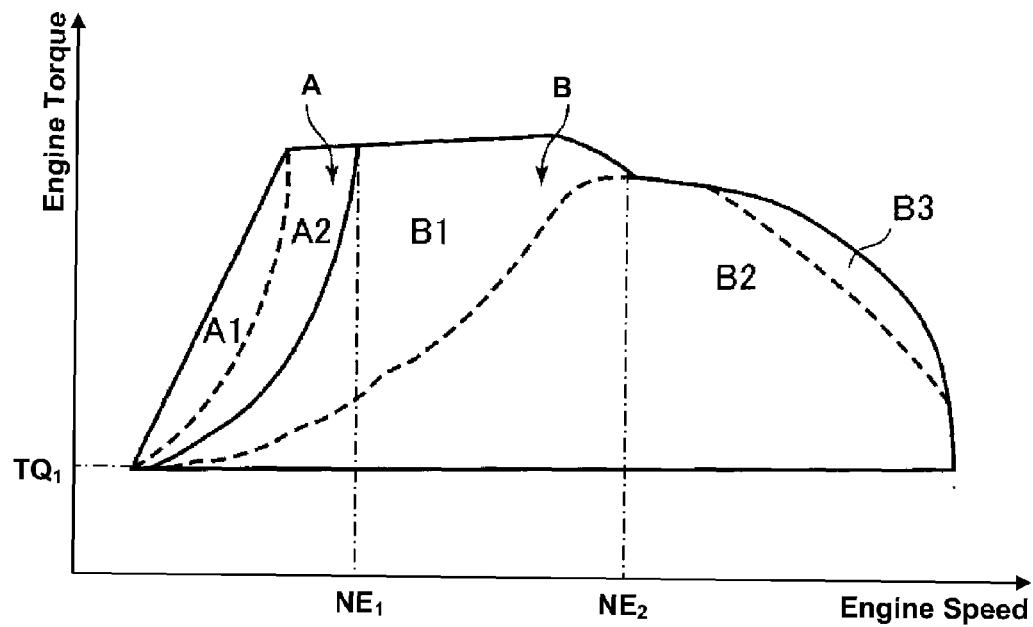
FIG. 5 shows different engine operating regions with different boosting performances for a supercharged engine system with an electric supercharger and a turbocharger.

Referring to FIG. 5, there are shown various effects to boost the intake air to the engine 1 in the various engine operating regions. In engine operating regions A and B where an engine output torque TQ is greater than a certain engine torque TQ1, the boosting effect can be observed. In other words, below the engine torque TQ1, the engine 1 can produce the desired torque without boosting the intake air. In the region A, the boosting effect from the electric supercharger 30 overcomes the boosting effect from the turbocharger 20. In the region B, the boosting effect from the electric supercharger 30 overcomes the boosting effect from the turbocharger 20. In a lower speed side A1 of the region A, the turbocharger 20 barely boosts the intake air, and basically the electric supercharger 30 exclusively boosts the intake air. On the other hand, in a higher speed side from the volume chambers 42 of the region A, the turbocharger 20 boosts the intake air to some extent, and both of the electric supercharger 30 and the turbocharger 20 show the boosting effect simultaneously.

In the region B or in a mid speed range and a higher speed range at the higher load side, the electric supercharger 30 is not able to substantially boost the intake air to the engine 1, and the turbocharger 20 exclusively boosts the intake air to the engine 1. In this embodiment, the turbocharger 20 is of the high speed type. Therefore, if the energy supplied to the turbine 21 were not increased, the engine output torque would drop in the mid speed range (see a broken line of FIG. 5) although the boosting performance would be improved in a region B2 at the higher speed side. In the contrary, in this embodiment, in the mid speed range, the energy of exhaust gas supplied to the turbine 21 is increased, and the boosting effect of the turbocharger 20 is increased to increase the engine output torque. In particular, in the mid speed range, the exhaust volume control valve 43 is opened, and the variable valve timing system 48 is controlled so that the exhaust valve 4 opens at the retarded timing EO2, in the mid speed range.

Figure 6:
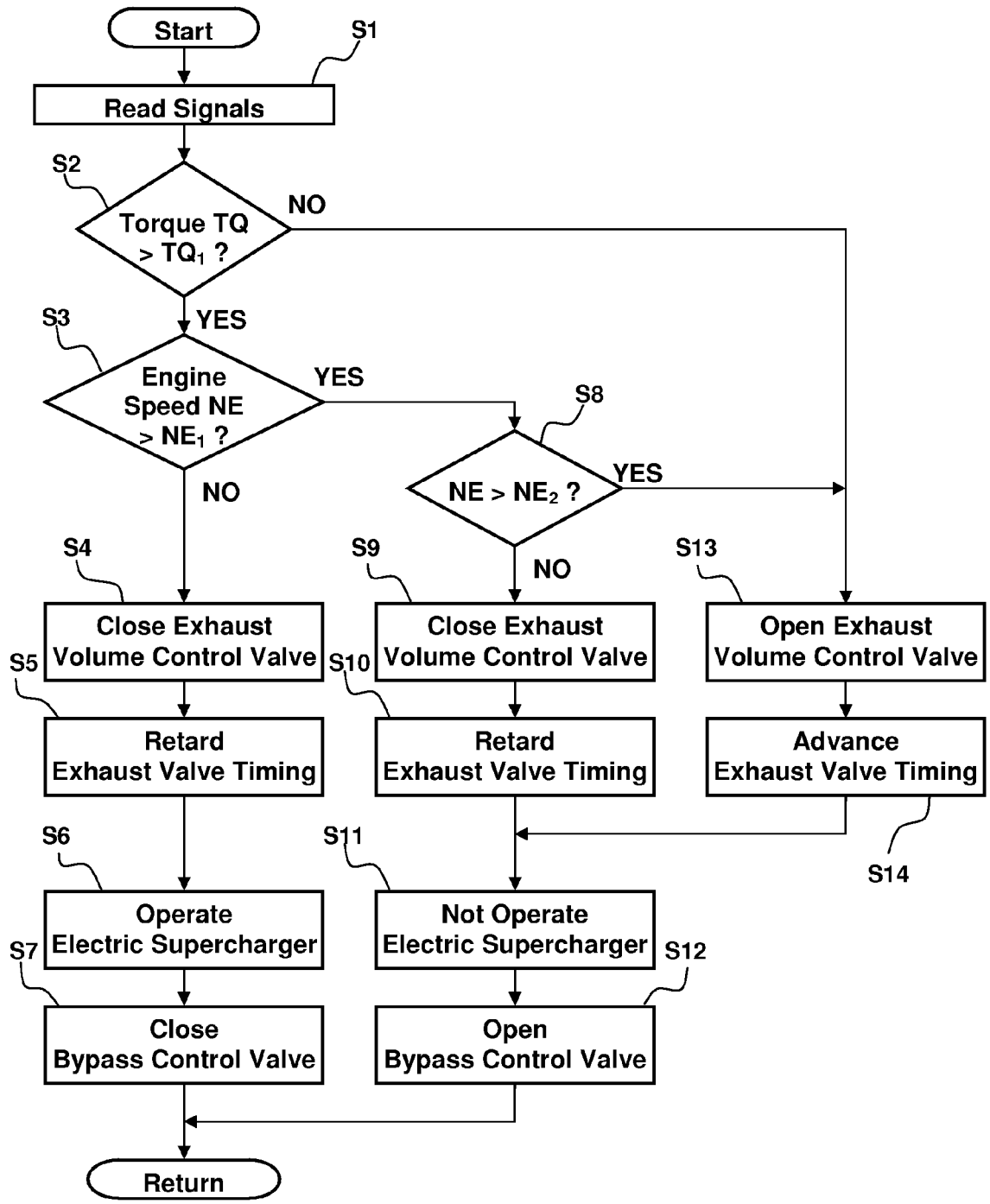
FIG. 6 shows a flowchart of a control routine executed according to the first embodiment.

Referring to FIG. 6, there is shown a flowchart of a routine the engine controller 50 executes. After the start, the routine proceeds to a step S1, and the engine controller 50 reads the various signals. Then, the routine proceeds to a step S2, and the engine controller 50 determines an engine operating condition based on the signals read at the step S1, and determines whether or not a desired engine output torque TQ, which is predominantly based on the accelerator pedal position detected by the accelerator position sensor 51, is greater than a predetermined torque $TQ_1$ or not. The predetermined torque $TQ_1$ corresponds to that shown in FIG. 5.

When it is determined at the step S2 that the desired engine torque TQ is greater than the predetermined torque $TQ_1$, which means that the intake air boost is required, the routine proceeds to a step S3 and determines whether or not the current engine speed NE detected by the engine speed sensor 52 is greater than a first predetermined engine speed $NE_1$. When it is determined at the step S3 that the engine speed NE is not greater than the first predetermined speed $NE_1$, which means that the engine 1 is in the lower speed range, the routine proceeds to a step S4, and the engine controller 50 controls the motor 46 of the variable exhaust volume system 40 to close the exhaust volume control valve 43 and shut off the discrete exhaust passages 16 from the volume chambers 40. After the step S4, the routine proceeds to a step S5, and the engine controller 50 controls the variable valve timing system 48 to set the retarded exhaust valve timing EVT2. Further, the routine proceeds to a step S6, and controls the electric motor of the electric supercharger 30 to operate. Then, the routine proceeds to a step S5, and the engine controller 50 controls the actuator 33 of the bypass control valve 32 to close the bypass passage 31, in order to boost the intake air to the engine 1 with the electric supercharger 30.

When it is determined at the step S3 that the engine speed NE is greater than the first predetermined engine speed $NE_1$, the routine proceeds to a step S8 and determines whether or not the current engine speed NE is greater than a second predetermined engine speed $NE_2$ which is greater than the first predetermined engine speed $NE_1$ as shown in FIG. 5. When it is determined at the step S8 that the current engine speed NE is not greater than the second predetermined engine speed $NE_2$, which means that the engine 1 is in the mid speed range, the routine proceeds to a step S9, and the engine controller 50 controls the motor 46 of the variable exhaust volume system 40 to close the exhaust volume control valve 43 and shut off the discrete exhaust passages 16 from the volume chambers 42. After the step S9, the routine proceeds to a step S10, and the engine controller 50 controls the variable valve timing system 48 to set the retarded exhaust cam phase EVT2. Further, the routine proceeds to a step S11, and controls the electric motor of the electric supercharger 30 not to operate. Then, the routine proceeds to a step S12, and the engine controller 50 controls the actuator 33 of the intake control valve 32 to open the bypass passage 31.

When it is determined at the step S8 that the current engine speed NE is greater than the second predetermined engine speed $NE_2$, which means that the engine 1 is in the higher speed range, the routine proceeds to a step S13, and the engine controller 50 controls the motor 46 of the variable exhaust volume system 40 to open the exhaust volume control valve 43 and communicate the discrete exhaust passages 16 with the volume chambers 42. After the step S13, the routine proceeds to a step S14, and the engine controller 50 controls the variable valve timing system 48 to set the advanced exhaust cam phase EVT1. Further, the routine proceeds to the steps S11 and S12, and the engine controller 50 controls the actuators as described above.

When it is determined at the step S2 that the desired engine output torque TQ is not greater than the predetermined engine torque $TQ_1$, which means that the intake air boost is not required, the routine proceeds to the steps 13, 14, 11 and then 12, and the engine controller 50 controls the actuators in the same way as is done when the engine 1 is in the higher speed range.

According to the present embodiment described above, in the lower engine speed range where the intake air boost by the turbocharger 20 is not enough, the electric supercharger 30 is driven, and the boosting effect of the electric supercharger can increase the engine output torque.

In the mid and higher engine speed range, the electric supercharger 30 is not driven, and the turbocharger 20 boosts the intake air. Then, the intake control valve 32 opens the bypass passage 31, and the air boosted by the turbocharger 20 is supplied through the bypass passage 31 to the engine 1.

In the mid engine speed range, the variable exhaust volume system 40 decreases the volume of the exhaust system 15 upstream of the turbine 21, and the variable valve timing system 48 delays the opening timing of the exhaust valve 4. As a result, the energy of the exhaust gas supplied to the turbine 21 is increased, and the boosting effect of the turbocharger 20 is improved even though the turbocharger 20 is inherently fit to the higher speed range in terms of its efficiency.

In more detail, as the volume of the exhaust system 15 upstream of the turbine 21 is smaller, the exhaust energy decrease by the exhaust gas expansion until it reaches the turbine 21 is reduced. When the exhaust volume control valve 43 of the variable exhaust volume system 40 is closed, and the volume of the exhaust system 15 upstream of the turbine 21 is reduced. As a result, the exhaust gas energy supplied to the turbine 21 is increased.

Figure 7:
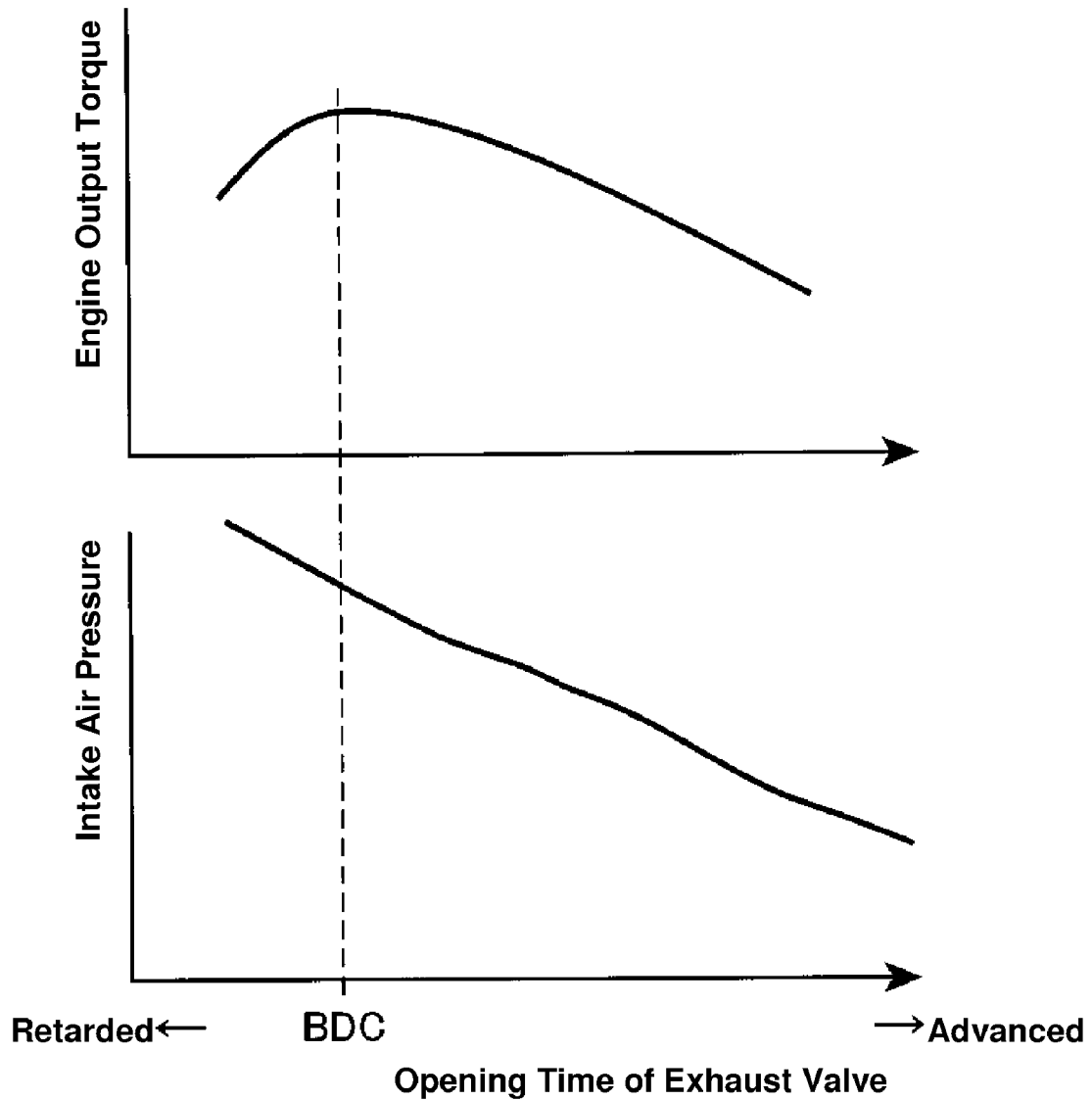
FIG. 7 are graphs of engine output torque and intake air pressure versus opening timing of exhaust valve for a supercharged engine.

With regard to the opening timing of the exhaust valve 4, as shown in FIG. 7, as the opening timing of the exhaust valve 4 is retarded, a boost pressure increases due to the increase of blow-down energy. On the other hand, when the opening timing of the exhaust valve 4 is retarded beyond the bottom dead center (BDC), the engine output torque is reduced due to the pump loss increase because the exhaust pressure acts against the upward moving piston. Accordingly, the opening timing of the exhaust valve 4 around the bottom dead center (BDC) may be most effective for the torque increase by the intake air boost.

In the present embodiment, as shown in FIG. 4, the closing timing of the exhaust valve 4 is retarded at the same time as the opening timing is because the variable valve timing system 48 retards the phase of the exhaust camshaft. As a result, an overlapping duration where both of the exhaust valve 4 and the intake valve 3 are opened is prolonged, thereby reducing the residual exhaust gas in the cylinders 2. Therefore, fresh air portion of the air charged in the cylinder is increased, and the engine output torque which is produced by combusting the fresh air and fuel is increased.

In the higher engine speed range, the exhaust volume control valve 43 of the variable exhaust volume system 40 is opened, and the volume of the exhaust system 15 upstream of the turbine 21 is increased. At the same time, the opening timing of the exhaust valve 4 is advanced to the second timing EVT1. As a result, the exhaust pressure increase is suppressed. Therefore, in the higher speed range where the amount of exhaust gas is greater, the pump loss increase and possibility of engine knocking due to the exhaust pressure increase can be suppressed. Even though the exhaust gas energy supplied to the turbine 21 is not particularly increased in the higher engine speed range, the turbocharger 20 itself fits to the higher speed range in terms of its operating efficiency, and the sufficient boosting effect can be obtained in the higher speed range.

The exhaust gas pressure in the higher engine speed range depends on a size of the turbine. As the turbine size is greater, the exhaust gas pressure becomes lower. Accordingly, by using the turbocharger with greater turbine size, the exhaust pressure increase in the higher engine speed range can be suppressed, and the exhaust pressure can be maintained lower than the intake air pressure.

In a region B3 at the highest speed side shown in FIG. 5, the waste gate valve 25 is opened, and part of the exhaust gas is released through the waste gate passage 24 to downstream of the turbine 21. Thereby, the exhaust pressure reduction effect is further improved.

As such, over the entire engine speed range consisting of the lower speed range, the mid speed range and the higher speed range, the greater boost effect can be presented, and the engine output torque can be increased. Also, in the wider operating range, the intake air pressure can be maintained higher than the exhaust gas pressure, thereby improving the boosting effect as well as fuel efficiency.

Although, in the above embodiment, both of the variable exhaust volume system 40 and the variable valve timing system 48 are provided to increase the exhaust energy in the mid engine speed range, only either one of them may be provided.

In addition to the variable valve timing system 48 for the exhaust valves 4 described above, a variable valve timing system 4 including the variable cam timing mechanism for the intake valves 3 may be provided as shown by a two-dotted line in FIG. 1. In this case, if, in the mid engine speed range, the phase of the intake camshaft is advanced to advance the opening timing of the intake valve 3 in addition to the retard of the closing timing of the exhaust valve 4, the overlap duration where the both intake and exhaust valves are open is prolonged, thereby further reducing the residual exhaust gas. The closing timing of the intake valve 3 is advanced, and the blow back of the air from the cylinder to the intake manifold can be suppressed. As a result, fresh air portion of the air charged in the cylinder is increased, and the engine output torque which is produced by combusting the fresh air and fuel is increased.

Figure 8:
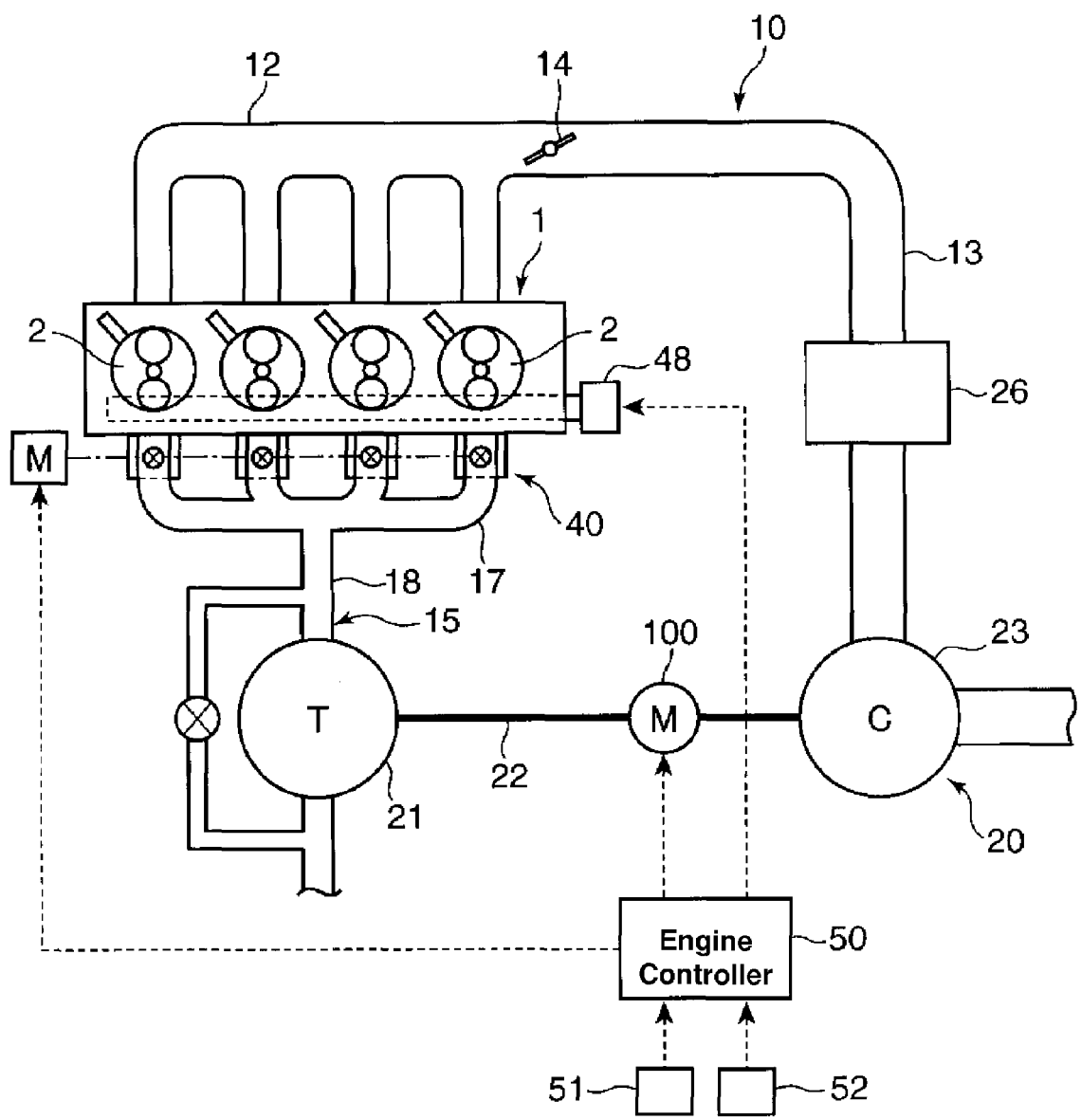
FIG. 8 shows a schematic view of a supercharged engine system according to an embodiment alternative to the first embodiment.

Although, in the above embodiment, the electric supercharger 30 is independent from the turbocharger 20 as shown in FIG. 1, an electric motor 100 may be integrated into the turbocharger 20 as shown in FIG. 8.

Specifically in this modified embodiment of FIG. 8, the electric motor 100 is configured to drive the shaft 22 which connects the turbine 21 and the compressor 23 of the turbocharger 23. When the electric motor 100 is driven, it assists the rotation of the compressor 23. In other words, the electric motor 100 and the compressor 23 function collectively as an electric supercharger.

Also in this modified embodiment, the electric motor 100 is driven only in the lower engine speed range. In the mid and higher speed ranges, the turbocharger 20 boosts the intake air to the engine 1 with no assist of the electric motor 100.

Figure 9:
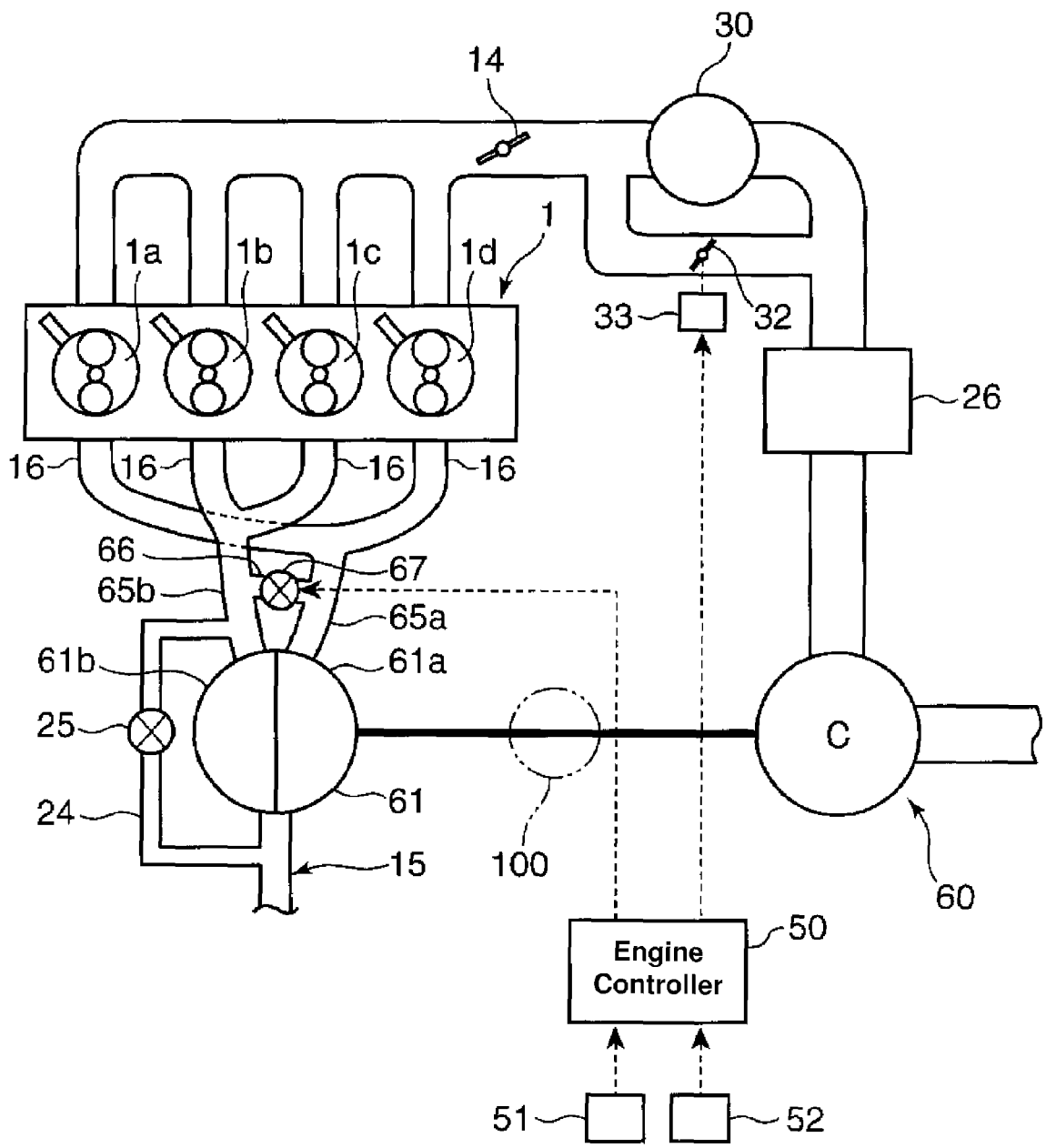
FIG. 9 shows a schematic view of a supercharged engine system according to a second embodiment of the present description.

Referring to FIG. 9, there is shown an overall construction of supercharged engine system in accordance with a second embodiment of the present description. A turbocharger 60 comprises a twin-scroll turbine 61 which has a first scroll 61a and a second scroll 61b. The exhaust system 15 comprises a first exhaust system which directs the exhaust gas from the first and fourth cylinders 1a and 1d to the first scroll 61a and a second exhaust system which directs the exhaust gas from the second and third cylinders 1b and 1c to the second scroll 61b. The combustion sequence of this engine 1 is the order of the cylinders #1-3-4-2. Therefore, each of the first and second scrolls 61a and 61b receives the exhaust gas from the cylinders whose combustions are not one after another in a row.

The first exhaust system consists of the discrete exhaust passages 16 from the first cylinder 1a and the fourth cylinders 1d and a first collecting passage 65a at an upstream end of which the two discrete passages merge. The second exhaust system consist of the discrete exhaust passages 16 from the second cylinder 1b and the third cylinders 1c and a second collecting passages 65b at an upstream end of which the two discrete passages merge. A communication passage 66 is arranged between the first collecting passage 65a and the second collecting passage 65b and connects these two passages. A communication control valve 67 is arranged in the connecting passage 66 and controllably closes it. The first and second exhaust systems, the communication passage 66 and the communication control valve 67 collectively regulate the energy of the exhaust gas supplied to the turbine 61.

The rest of the structure of the second embodiment is the same as the first embodiment shown in FIG. 1. Also, in this second embodiment, the electric supercharger 30 may be independent from the turbocharger 60 as illustrated by a solid line in FIG. 9, or alternatively the electric motor 100 may be integrated into the turbocharger 60 as illustrated by a two-dotted line in FIG. 9.

Figure 10:
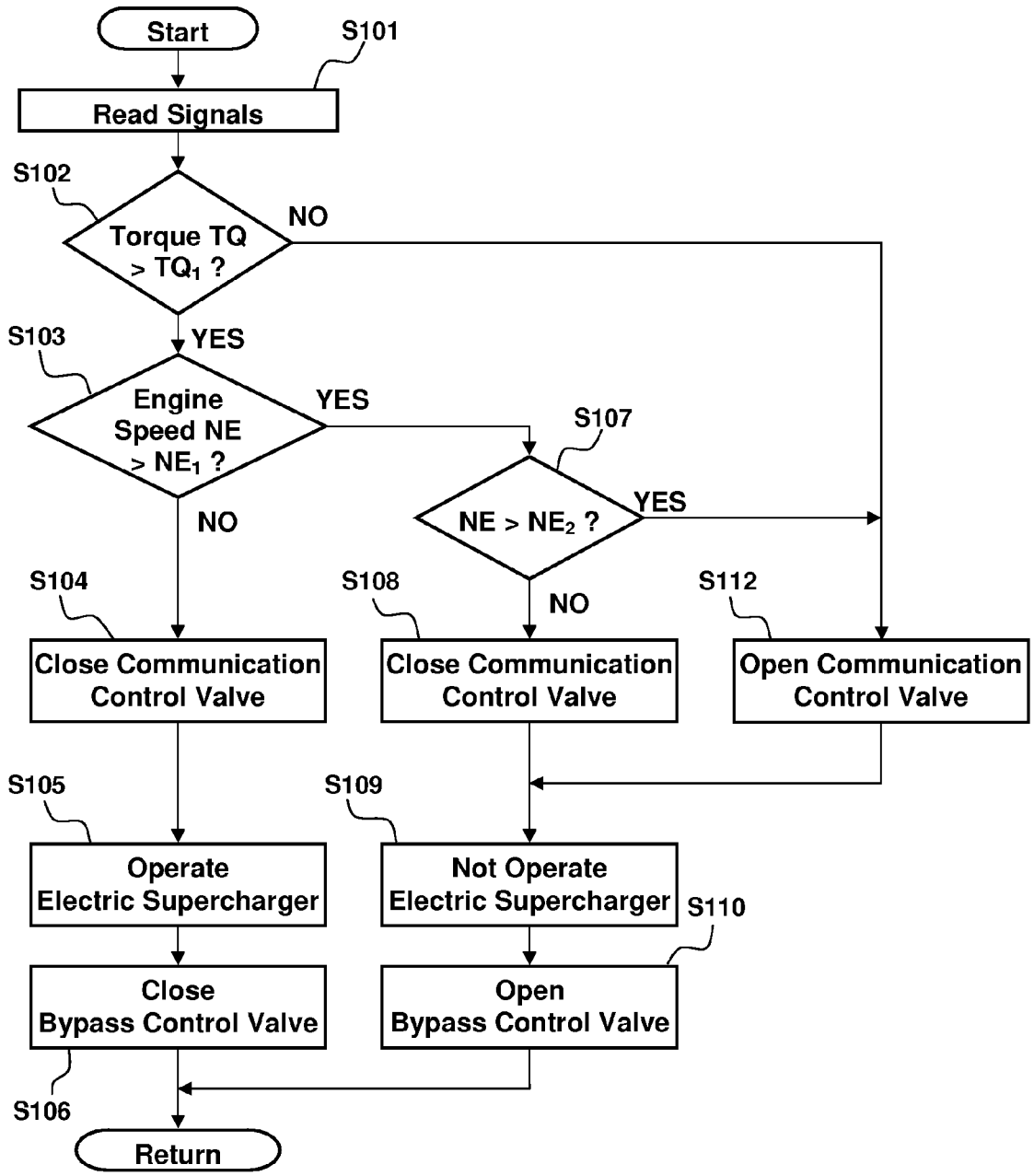
FIG. 10 shows a flowchart of a control routine executed according to the second embodiment.

Referring to FIG. 10, there is shown a flowchart of a routine the engine controller 50 executes in accordance with the second embodiment. After the start, the routine proceeds to a step S101, and the engine controller 50 reads the various signals. Then, the routine proceeds to a step S102, and the engine controller 50 determines an engine operating condition based on the signals read at the step S101, and determines whether or not a desired engine output torque is greater than the predetermined torque TQ1.

When it is determined at the step S102 that the engine torque is greater than the predetermined torque TQ1, which means that the intake air boost is required, the routine proceeds to a step S103 and determines whether or not the current engine speed NE is greater than the first predetermined engine speed NE1. When it is determined at the step S103 that the engine speed NE is not greater than the predetermined speed NE1, which means that the engine 1 is in the lower speed range, the routine proceeds to a step S104, and the engine controller 50 controls the communication control valve 67 to shut the communication passage 66. After the step S104, the routine proceeds to a step S105, and the engine controller 50 controls the electric motor of the electric supercharger 30 to operate. Then, the routine proceeds to a step S106, and the engine controller 50 controls the actuator 33 of the intake control valve 32 to close the bypass passage 31, in order to boost the intake air to the engine 1 with the electric supercharger 30.

When it is determined at the step S103 that the engine speed NE is greater than the first predetermined engine speed NE1, the routine proceeds to a step S107 and determines whether or not the current engine speed NE is greater than the second predetermined engine speed NE2. When it is determined at the step S8 that the current engine speed NE is not greater than the second predetermined engine speed NE2, which means that the engine 1 is in the mid speed range, the routine proceeds to a step S108, and the engine controller 50 controls the communication control valve 67 to close the communication passage 66. After the step S108, the routine proceeds to a step S109, and the engine controller 50 controls the electric motor of the electric supercharger 30 not to operate. Then, the routine proceeds to a step S110, and the engine controller 50 controls the actuator 33 of the intake control valve 32 to open the bypass passage 31.

When it is determined at the step S107 that the current engine speed NE is greater than the second predetermined engine speed NE2, which means that the engine 1 is in the higher speed range, the routine proceeds to a step S113, and the engine controller 50 controls the communication control valve 67 to open the communication passage 66 thereby communicating the first and second collecting passages 65a and 65b. Further, the routine proceeds to the steps S109 and S110, and the engine controller 50 controls the actuators as described above.

When it is determined at the step S102 that the desired engine output torque TQ is not greater than the predetermined engine torque TQ1, which means that the intake air boost is not required, the routine proceeds to the steps 112, 109, and then 110, and the engine controller 50 controls the actuators in the same way as is done when the engine 1 is in the higher speed range.

According to the second embodiment, in the lower engine speed range, the electric supercharger 30 is driven. In the mid and higher speed ranges, the electric supercharger 30 is not driven, and the turbocharger 20 boosts the intake air.

In the mid speed range, the communication control valve 67 closes the communication passage 66 so that the first and second collecting passages 65a and 65b are shut from each other. As a result, exhaust gases from the first collecting passage 65a and the second collecting passage 65b are separately directed to the first and second scroll 61a and 61b of the turbine 61, thereby preventing interference between the first and second exhaust systems and maintaining pulsations of the exhaust gas. This leads to increasing the exhaust gas energy supplied to the turbine 60 to improve the boosting effect and increase the engine output torque.

In the higher engine speed range, the communication control valve 67 is opened, thereby to interfere the pulsations of the exhaust gas and to reduce the exhaust pressure. Accordingly, in the higher engine speed range where the exhaust gas flow is greater, the exhaust pressure increase may be suppressed, thereby to reduce the pump loss, and to more effectively boost the intake air to the engine 1.

Referring to FIG. 9, there is shown an overall construction of supercharged engine system in accordance with a third embodiment of the present description. A turbocharger 80 comprises a turbine 71 arranged in the exhaust system, a compressor 73 arranged in the intake system, a shaft connecting the turbine 71 and the compressor 73, and a variable vanes arranged at the intake side of the turbine 71.

Figure 12:
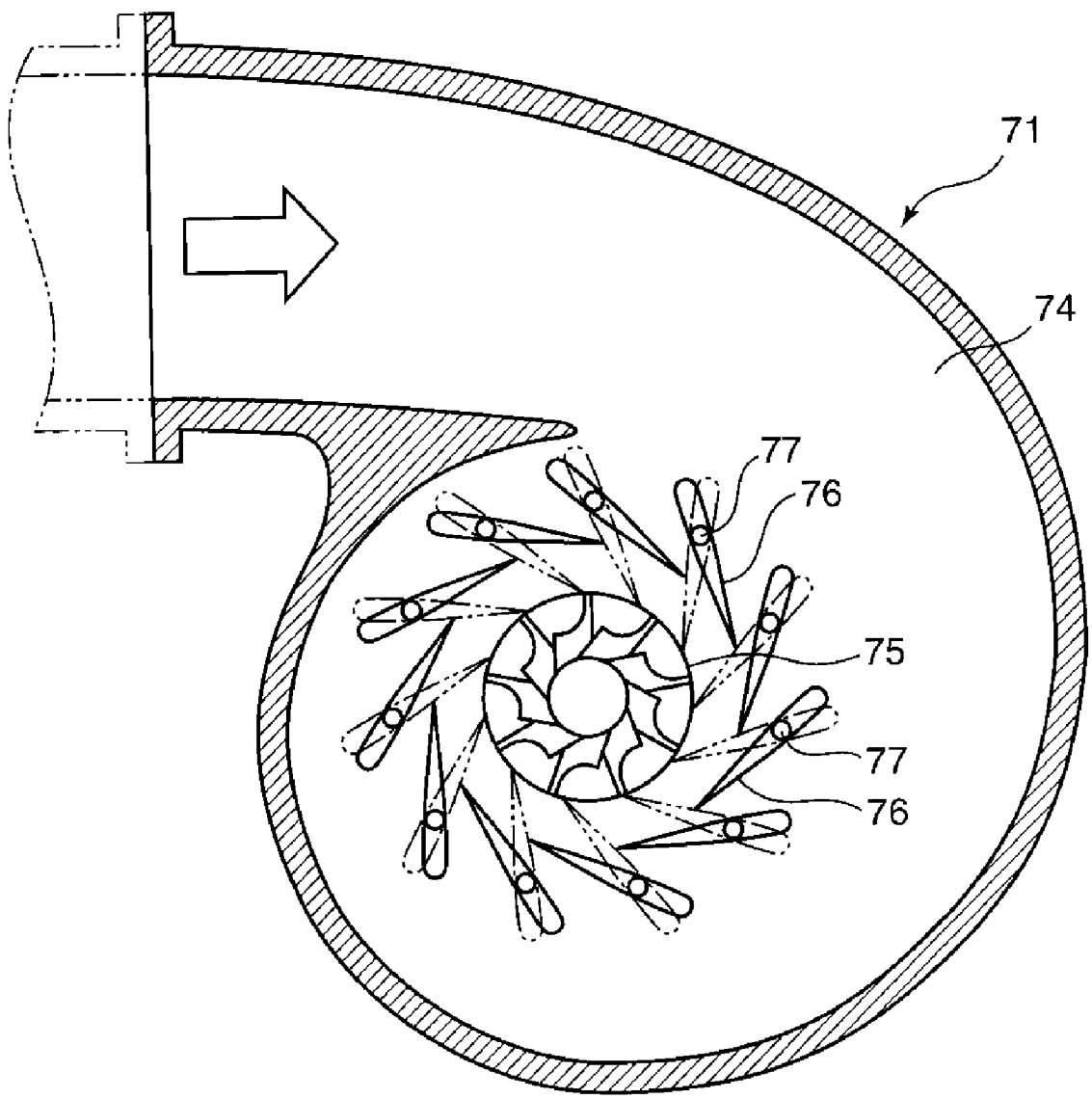
FIG. 12 shows a detail view of the variable geometry turbine of the third embodiment.

As shown in FIG. 12, the turbine 71 comprises a turbine chamber 74 into which the exhaust gas is directed, and a plurality of moveable vanes 76 arranged to surround turbine blades of a turbine wheel 75. The moveable vanes 76 can pivot about shafts 77, thereby to change an opening degree of the vanes 76 or a sectional area or an opening degree of nozzles defined by the adjacent vanes 76.

When the moveable vanes 76 are positioned to get closer to each other or to extend in a direction closer to the circumferential direction of the turbine wheel 75 as shown by a solid line in FIG. 12, the opening degree of the vanes 76 is reduced. When the opening degree is reduced especially in the lower engine speed range, a flow rate of the exhaust gas through the vane nozzles is increased, and a flow direction of the exhaust gas through the vane nozzles is directed closer to a tangential direction of the turbine wheel 75, thereby improving operational efficiency of the turbine 71 and eventually boosting efficiency of the turbocharger 70. However, it may increase the exhaust pressure.

On the other hand, when the moveable vanes 76 are positioned to get more separated from teach other or to extend in a direction closer to the radial direction as shown by a two-dotted line in FIG. 12, the opening of the vane nozzles are increased. When the opening degree of the vane nozzles are caused greater especially in the higher engine speed range, the exhaust gas flow may be maintained greater, and the boosting efficiency of the turbocharger 70 may be improved.

Figure 11:
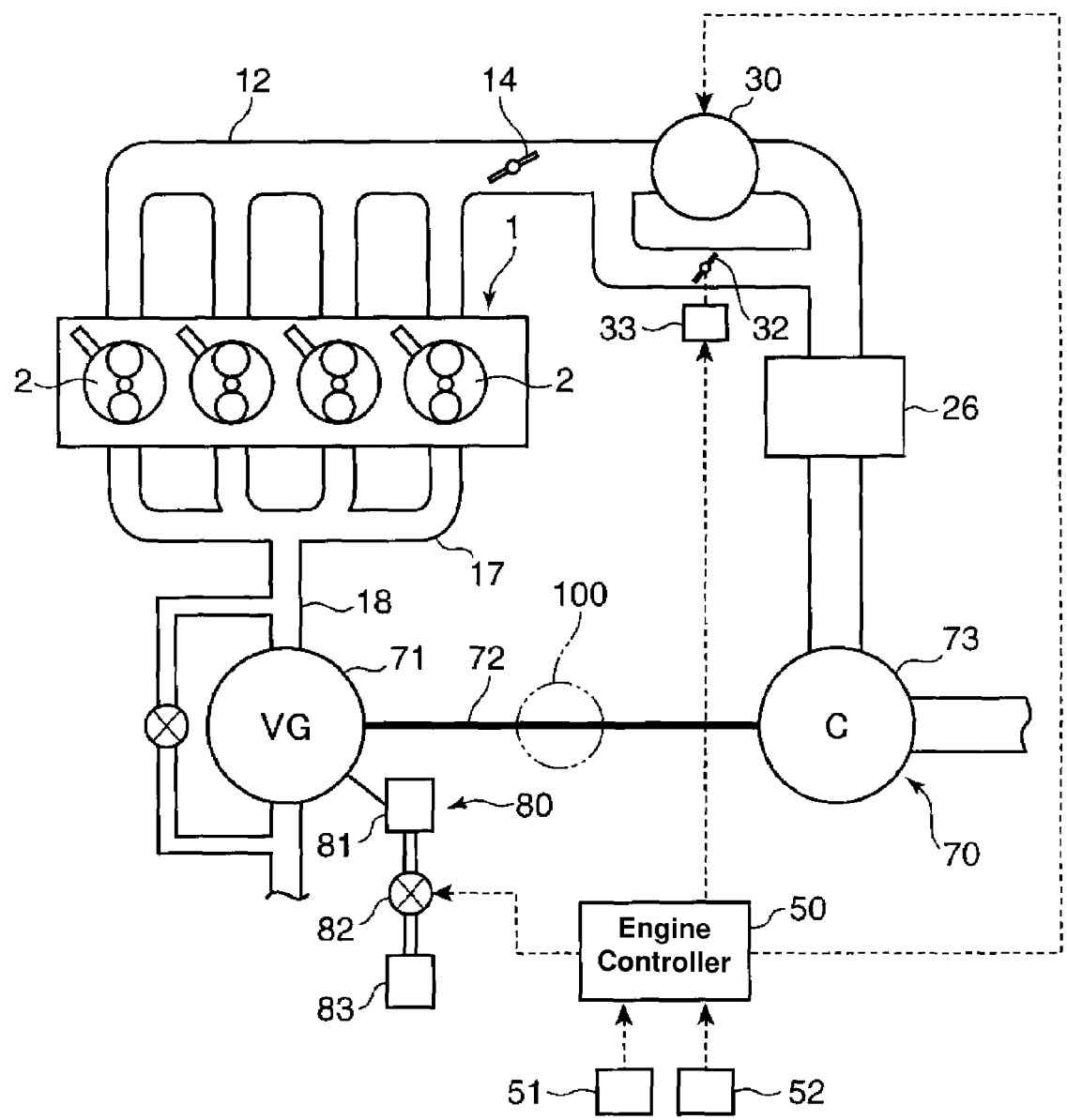
FIG. 11 shows a schematic view of a supercharged engine system having a variable geometry turbine (VGT) in accordance with a third embodiment of the present description.

As shown in FIG. 11, a vane actuator 80 is arranged in the vicinity of the turbocharger 70 and rotates the shafts 77 of the moveable vanes 76 and changes angular positions and the opening degree of the moveable vanes. The vane actuator 80 comprises a vacuum pusher 81, a solenoid valve 82 arranged in a vacuum supply conduit to the vacuum pusher 81, a vacuum pump 83 as a vacuum supply source, and the like. The solenoid valve 82 is controlled by the engine controller 50, thereby changing the vacuum in the pusher 81 and eventually the opening degree of the moveable vanes 76.

The rest of the supercharged engine system according to the third embodiment is similar to that of the first embodiment illustrated in FIG. 1. Also in the third embodiment, the electric supercharger 30 may be independent from the turbocharger 70 as shown by a solid line in FIG. 11, or the electric motor 100 may be integrated into the turbocharger 70 as shown by a two-dotted line in FIG. 11.

In the third embodiment, in the lower and higher speed ranges, the opening degree of the moveable vanes 76 is reduced or the nozzles are restricted to improve the boost performance. However, if the nozzles were restricted too much and the exhaust pressure exceeded the intake pressure, the pump loss would be increased, the engine knocking would be more likely to occur, and the torque increase could not be achieved.

In this regard, in the lower engine speed range, the electric supercharger 30 is driven to increase the intake pressure, and the opening degree of the moveable vanes 76 is adjusted so that the exhaust pressure is reduced below the intake pressure.

In the mid engine speed range, the turbocharger 70 boosts the intake air to the engine 1, while the electric supercharger 30 is not driven, the opening degree of the moveable vanes 76 is adjusted so that the vane nozzles are restricted to the extent that the exhaust pressure does not exceed the intake pressure. In the higher engine speed range, the turbocharger 70 boosts the intake air to the engine 1, while the moveable vanes 76 are fully opened.

It is needless to say that the invention is not limited to the illustrated embodiments. Therefore, alternative designs are possible without departing from the substance of the invention as claimed in the attached claims.

The invention claimed is:

1. A method of controlling an engine system comprising an internal combustion engine having an exhaust valve, a supercharging system having at least one supercharger to boost intake air to said internal combustion engine, a turbine, and a motor, wherein said turbine receives an exhaust gas flow from an exhaust system of said internal combustion engine and drives said at least one supercharger, and wherein said motor drives either said at least one supercharger or a second supercharger of said supercharger system, and a controller which controls said exhaust valve and said motor, the method comprising:

operating said exhaust valve in a first exhaust state where said exhaust valve opens at a first exhaust open timing during a cylinder cycle and operating said motor in a first motor state when a speed of said internal combustion engine is below a first engine speed;

operating said exhaust valve in said first exhaust state and operating said motor in a second motor state where power to drive said motor is reduced from that in said first motor state when the speed of said internal combustion engine is between said first engine speed and a second engine speed, said second engine speed being greater than said first engine speed; and operating said exhaust valve in a second exhaust state where said exhaust valve opens at a second exhaust open timing which is earlier than said first exhaust open timing during a cylinder cycle whereby energy transmitted from said internal combustion engine to said turbine is reduced from that in said first exhaust state and operating said motor in said second motor state when the speed of said internal combustion engine is above said second engine speed.

2. The method as described in claim 1, further comprising:

closing said exhaust valve after opening of an intake valve of said internal combustion engine during the cylinder cycle by a first overlap period in said first exhaust state; and closing said exhaust valve after the opening of said intake valve during the cylinder cycle by a second overlap period that is less than said first overlap period in said second exhaust state.

3. The method as described in claim 2, further comprising:

closing said exhaust valve at a first exhaust close timing during the cylinder cycle in said first exhaust state; and closing said exhaust valve at a second exhaust close timing during the cylinder cycle in said second exhaust state, said second exhaust close timing being earlier than said first exhaust close timing.

4. The method as described in claim 3, further comprising:

opening said intake valve at a first intake open timing during the cylinder cycle in said first exhaust state; and opening said intake valve at a second intake open timing during the cylinder cycle in said second exhaust state, said second intake open timing being later than said first intake open timing.

5. The method as described in claim 1, wherein said engine system comprises a volume chamber to communicate with said exhaust system between said exhaust valve and said turbine, an exhaust control valve to selectively shut off said volume chamber from said exhaust system, wherein the controller controls said exhaust control valve, the method further comprising:

operating said exhaust control valve in the first exhaust state where a first volume of said exhaust system is made between said exhaust valve and said turbine when the speed of said internal combustion engine is below said first engine speed;

operating said exhaust control valve in said first exhaust state when the speed of said internal combustion engine is between said first engine speed and said second engine speed; and operating said exhaust control valve in the second exhaust state where a second volume of said exhaust system is made between said internal combustion engine and said turbine, said second volume being greater than said first volume, whereby energy transmitted from said internal combustion engine to said turbine is reduced from that in said first exhaust state when the speed of said internal combustion engine is above said second engine speed.

6. The method as described in claim 1, wherein said internal combustion engine has a plurality of cylinders, wherein said exhaust system has a first discrete passage connecting between a first of said cylinders and said turbine, a second discrete passage connecting between a second of said cylinders and said turbine, and a connecting passage connecting said first and second discrete passages, the method further comprising:

closing said connecting passage in said first exhaust state; and opening said connecting passage in said second exhaust state.

7. The method as described in claim 1, wherein said exhaust system has a variable nozzle capable of regulating exhaust gas flow to said turbine, the method further comprising:

positioning said variable nozzle so as to regulate more the exhaust gas flow in said first exhaust state than in said second exhaust gas state.

8. The method as described in claim 1, wherein said supercharging system comprises a first supercharger driven by said motor, a second supercharger driven by said turbine and a bypass passage bypassing said first supercharger, the method further comprising:

opening said bypass passage more in said second motor state than in said first motor state.

9. The method as described in claim 1, further comprising:

supplying power to drive said motor in said first motor state; and shutting off the power to drive said motor in said second motor state.

10. The method as described in claim 9, wherein said supercharging system comprises a first supercharger driven by said turbine, a second supercharger driven by said motor and a bypass passage bypassing said second supercharger, the method further comprising:

closing said bypass passage in said first motor state; and opening said bypass passage in said second motor state.

11. A method of controlling an engine system comprising an internal combustion engine having an exhaust valve, a supercharging system having at least one supercharger to boost intake air to said internal combustion engine, a turbine, and a motor, wherein said turbine receives an exhaust gas flow from an exhaust system of said internal combustion engine and drives said at least one supercharger, and wherein said motor drives either said at least one supercharger or a second supercharger of said supercharging system, a volume chamber to communicate with said exhaust system between said exhaust valve and said turbine, an exhaust control valve to shut off said volume chamber from said exhaust system, and a controller which controls said exhaust control valve and said motor, the method comprising:

operating said exhaust control valve in a first exhaust state where a first volume of said exhaust system is made between said exhaust valve and said turbine and operating said motor in a first motor state when a speed of said internal combustion engine is below a first engine speed;

operating said exhaust control valve in said first exhaust state and operating said motor in a second motor state where power to drive said motor is reduced from that in said first motor state when the speed of said internal combustion engine is between said first engine speed and a second engine speed, said second engine speed being greater than said first engine speed; and operating said exhaust control valve in a second exhaust state where a second volume of said exhaust system is made between said internal combustion engine and said turbine, said second volume being greater than said first volume, whereby energy transmitted from said internal combustion engine to said turbine is reduced from that in said first exhaust state and operating said motor in said second motor state when the speed of said internal combustion engine is above said second engine speed.

12. A system comprising:
an internal combustion engine having an exhaust valve;
an exhaust system variably directing an exhaust gas flow from said internal combustion engine to downstream;
a supercharging system having at least one supercharger to boost intake air to said internal combustion engine, a turbine which receives an exhaust gas flow from said exhaust system and drives said at least one supercharger, and a motor which drives either said at least one supercharger or a second supercharger of said supercharging system; and
a controller configured to:
operate said exhaust valve in a first exhaust state where said exhaust valve opens at a first exhaust open timing during a cylinder cycle and operate said motor in a first motor state when a speed of said internal combustion engine is below a first engine speed;
operate said exhaust valve in said first exhaust state and operate said motor in a second motor state where power to drive said motor is reduced from that in said first motor state when the speed of said internal combustion engine is between said first engine speed and a second engine speed, said second engine speed being greater than said first engine speed; and
operate said exhaust valve in a second exhaust state where said exhaust valve opens at a second exhaust open timing which is earlier than said first exhaust open timing during a cylinder cycle whereby energy transmitted from said internal combustion engine to said turbine is reduced from that in said first exhaust state and operate said motor in said second motor state when the speed of said internal combustion engine is above said second engine speed.

13. The system as described in claim 12, wherein said internal combustion engine has a plurality of cylinders, wherein said exhaust system has a first discrete passage connecting between a first of said cylinders and said turbine, a second discrete passage connecting between a second of said cylinders and said turbine, a connecting passage connecting said first and second discrete passages, and an exhaust control valve arranged in said connecting passage, and wherein said controller is further configured to:
control said exhaust control valve to close said connecting passage in said first exhaust state; and
control said exhaust control valve to open said connecting passage in said second exhaust sate.

14. The system as described in claim 12, wherein said exhaust system has a variable nozzle capable of regulating exhaust gas flow to said turbine, and wherein said controller is farther configured to:
control said variable nozzle to regulate more the exhaust gas flow in said first exhaust state than in said second exhaust gas state.

15. The system as described in claim 12, wherein said supercharging system comprises a first supercharger driven by said turbine, said second supercharger driven by said motor, a bypass passage bypassing said second supercharger and a bypass control valve to close said bypass passage, and wherein said controller is further configured to:
control said bypass control valve to close said bypass passage in said first motor state; and
control said bypass control valve to open said bypass passage in said second motor state.

16. The system as described in claim 15, further comprising a power source to supply power to said motor, and wherein said controller is further configured to:
control said power source to supply power to drive said motor in said first motor state; and
control said power source to shut off the power to drive said motor in said second motor state.

17. A system comprising:
an internal combustion engine having an exhaust valve;
an exhaust system variably directing an exhaust gas flow from said internal combustion engine to downstream;
a supercharging system having at least one supercharger to boost intake air to said internal combustion engine, a turbine which receives the exhaust gas flow from said exhaust system and drives said at least one supercharger. and a motor which drives either said at least one supercharger or a second supercharger of said supercharging system;
a volume chamber to communicate with said exhaust system between said internal combustion engine and said turbine;
an exhaust control valve to shut off said volume chamber from said exhaust system; and
a controller configured to:
operate said exhaust control valve in a first exhaust state where said exhaust control valve shuts off said volume chamber from said exhaust system between said internal combustion engine and said turbine and operate said motor in a first motor state when a speed of said internal combustion engine is below a first engine speed;
operate said exhaust control valve in said first exhaust state and operate said motor in a second motor state where power to drive said motor is reduced from that in said first motor state when the speed of said internal combustion engine is between said first engine speed and a second engine speed, said second engine speed being greater than said first engine speed; and
operate said exhaust control valve in a second exhaust state where said exhaust control valve communicates said volume chamber with said exhaust system between said internal combustion engine and said turbine, whereby energy transmitted from said internal combustion engine to said turbine is reduced from that in said first exhaust state and operate said motor in said second motor state when the speed of said internal combustion engine is above said second engine speed.

* * * * *